March 25, 1952 — H. L. JACKSON — 2,590,540
MAGNETRON BEACON
Filed June 28, 1946 — 7 Sheets-Sheet 1

WITNESSES:

INVENTOR
Hagan L. Jackson.
BY
ATTORNEY

March 25, 1952

H. L. JACKSON 2,590,540

MAGNETRON BEACON

Filed June 28, 1946

INVENTOR
Hagan L. Jackson.
BY
ATTORNEY

March 25, 1952 H. L. JACKSON 2,590,540
MAGNETRON BEACON

Filed June 28, 1946 7 Sheets-Sheet 4

Fig. 7.

WITNESSES:

INVENTOR
Hagan L. Jackson.
BY
Hymen Diamond.
ATTORNEY

March 25, 1952 H. L. JACKSON 2,590,540
MAGNETRON BEACON
Filed June 28, 1946 7 Sheets-Sheet 5

Fig. 8A.

WITNESSES:
E. A. McCloskey
Wm. L. Groome

INVENTOR
Hagan L. Jackson.
BY
Hymen Diamond.
ATTORNEY

Patented Mar. 25, 1952

2,590,540

UNITED STATES PATENT OFFICE 2,590,540

MAGNETRON BEACON

Hagan L. Jackson, Baltimore, Md., assignor to Westinghouse Electric Corporation, East Pittsburgh, Pa., a corporation of Pennsylvania Application June 28, 1946, Serial No. 679,957

3 Claims. (Cl. 332—5)

My invention relates to signalling apparatus and it has particular relation to aircraft navigation apparatus.

Signalling apparatus to which my invention relates may be divided into two categories; navigation aids for flying along a predetermined course and navigation aids for approaching a landing strip and landing. Navigation aids for flying on course constructed and operated in accordance with the teachings of the prior art of which I am aware comprises audio modulated ground beacons and means on the aircraft for receiving and demodulating the signals from the beacons and for determining their characteristics audibly. The aircraft personnel responsible for navigation hear the beacon signals and by their characteristics determine if the craft is on course and if not the sense in which and the extent to which it is off course.

Navigation equipment for approaching and landing on an air strip constructed and operated in accordance with the prior art of which I am aware is the so-called ground control approach (GCA) equipment. Such equipment comprises a radar capable of providing information as to range, bearing and elevation of a craft within its range of detection. When an aircraft to be landed is approaching a strip, the radar operator determines its range, bearing and elevation. He or his associates then communicates with the pilot of the approaching plane and inform the pilot of the manner in which the latter is to navigate the craft in landing it.

One disadvantage of the prior art air navigation apparatus is that it requires components of different types for course navigation purposes and for landing purposes. In the interest of economy it is desirable that the components installed for course navigation purposes be of the same construction as those installed for landing purposes. As far as the equipment installed aboard the aircraft is concerned, separate components for performing course navigation and landing functions have the disadvantage that they increase the weight of equipment carried by the craft, thus decreasing the paying load.

The prior art navigation equipment also has a psychological disadvantage as far as the pilot is concerned. When flying blind, the pilot is required to rely, not on his sense of vision, but on his sense of hearing. When a craft is flying in flat country, this psychological uncertainty is a minor handicap to the pilot. He knows his approximate altitude and is reasonably certain that he will encounter no serious difficulties. However, when the aircraft is in mountainous regions, the pilot must necessarily feel uneasy. He has no visual image of the course. The course indicated by the audio signal may after all be incorrect, and he may be piloting the craft into an obstruction.

During a blind landing operation, performed in accordance with the teaching of the prior art, the uneasiness of the pilot is enhanced. Now the aircraft is, in effect, controlled by someone on the ground. The pilot merely functions as the agent for operating the controls as the ground operator directs him; he might as well be an automatic mechanism. A pilot thus deprived of the control of his craft with his life and the lives of the remainder of the crew and the passengers in the hands of some one of whose reliability he is not certain is under severe mental pressure.

Ground control approach apparatus has a further disadvantage that it is excessively time consuming in low ceiling weather. An interval of twenty minutes may be consumed in directing an aircraft to approach from a position a few miles from a strip and to land on the strip. Under such circumstances large numbers of aircraft awaiting their turn to land circle about an air strip for long time intervals and the risk of accidents is increased.

In accordance with the teachings of the prior art, signalling systems designed to mark a complete landing area as distinct from a landing strip are available. Such systems afford the pilot of an approaching craft a visual indication of the marking. An example of a signalling system of this type is disclosed in Patent 2,151,549 to Becker. In accordance with Becker's disclosure, the area of the airport is marked off by beacons. Aircraft is provided with a receiving system designed to receive signals from the beacons. The pilot of a craft approaching the airport has available a display on the indicator of the receiving system which informs him as to the positions of the beacons marking the airport. The display does not however enable the pilot to land the craft. He does not know where in the large area the landing strip on which he is to land is located. The ground control approach equipment is still necessary. The Greig Patent 2,268,860, the Morgan Patent 2,396,112, and Patents 2,397,746—Lewis, and 2,279,246—Podliasky et al. disclose similar systems.

It is accordingly an object of my invention to provide aircraft navigation apparatus in which the components used for course navigation and the components used for blind approach and blind landing shall be of the same construction.

Another object of my invention is to provide an aircraft navigation system in which the same component installed aboard an aircraft shall serve both for course navigation and for blind approach and blind landing.

A further object of my invention is to provide an air navigation system in which the components of the same construction installed on the ground or an aircraft shall serve for course navigation, for blind approach and blind landing and for anti-collision warning.

Still another object of my invention is to provide an aircraft navigation system with facilities for making available to aircraft crew a visual representation of the course along which the craft is flying.

A still further object of my invention is to provide a blind approach and blind landing system which shall include facilities for making available to the pilot a visual representation of the air strip during the landing operation.

An ancillary object of my invention is to provide a beacon of simple structure for use both on aircraft and on the ground.

Another ancillary object of my invention is to provide an air navigation system which shall include an anti-collision facility.

A further ancillary object of my invention is to provide an air-borne position indicating system, the indicator of which shall make available a strikingly discernible image of the signal received.

Comprehensively stated it is an object of my invention to provide an integrated air navigation system for course navigation, for blind approach and blind landing and for anti-collision purposes.

In accordance with my invention I provide an aircraft navigation system in which an array of beacons are arranged along the course of the aircraft. The aircraft is provided with a receiving system designed to receive signals from the beacons. The beacon signals are impressed on the indicator of the receiver as spots and produce a display dependent on the course which the aircraft is following. If the aircraft is on course, the display has a predetermined configuration. If the aircraft is off course, the display is distorted in a manner corresponding to the sense in which, and the extent to which, the aircraft is off course. The display has the appearance of a continuously changing picture of an airway marked by a system of lights analogous to a lighted motor highway. The course information provided by the display is primarily the relative bearings of the individual beacons and the elevation of the aircraft relative to the beacons.

For blind approach and blind landing, the air strips on which aircraft is to land is marked off by beacons of the same construction as those marking the course. Arrays of such beacons are disposed in effect along those boundaries of the landing strips of an airport which are longitudinal to the direction of movement of a landing craft on the strips. A pair of beacons are also provided at the starting boundary of each of the strips at points displaced a substantial distance from the longitudinal boundaries. The latter beacons mark the start of the strip, and the former mark the boundaries of the strip. Depending on the direction of the wind, the beacons along one or the other of the strips are supplied with potential.

When a craft is approaching a strip, a display corresponding to its position relative to the strip is produced by the strip beacons on the indicator of its receiving system which serves for course flying. The display corresponding to the two beacons along the starting boundary, which appears as two dots, is discernible while the pilot is still a substantial distance from the strip. In informs the pilot as to the direction in which he is approaching. By controlling the craft so that this display follows a predetermined pattern, the pilot can cause the craft to approach along the center line of the strip. When the aircraft is near the strip and is about to be landed, the indications from the beacons along the boundary of the strip provide an array informing the pilot as to the position of the craft relative to the longitudinal boundaries of the strip. The display of the approached landing strip gives the pilot the same impression as he would receive by viewing at night through a window of the craft, a strip marked at its start by two lights and along its boundaries by arrays of lights.

The air-borne receiving system in accordance with my invention is provided with a directional antenna preferably having a small half power beam width of the order of five degrees. The antenna is mounted in the fuselage of the craft, or in its noses and is moved in such manner that a hypothetical line through its principal lobe scans a region external to the plane. If the base about which the antenna moves is maintained fixed with reference to the bow-stern line of the craft, the relative bearing and elevation of a beacon from which a signal is received by the antenna in any given position of the craft always have the same magnitudes for the same relative physical features of the craft and beacon. Preferably, the antenna should be mounted so that when it is moved the hypothetical center line through its lobe generates a solid angle, the apex of which is at the bow of the craft and the center of which extends along the bow-stern line of the craft. Under such circumstances the center line of the solid angle is horizontal when the craft is horizontal and when the craft is inclined has an inclination equal to that of the craft. When the center line intersects a beacon or a group of beacons the craft is moving directly towards these components.

The indicator of the receiver is preferably an ordinary oscilloscope. It is scanned in synchronism with a movement of the antenna, the angular position of its cathode ray beam at any instant corresponding to the angular position relative to the bow-stern line of the craft of the lobe center line. Each point on the indicator accordingly has the coordinates, relative elevation and relative bearing. When the cathode ray beam impinges on a point on the screen of the indicator, the line through the lobe center of the antenna is extending in a direction having the relative elevation and bearing of the point on the indicator screen.

My invention in its broader aspects may be practiced with beacons of known types. However in its specific aspects my invention contemplates the provision of a beacon of simple structure. In accordance with my invention the beacon comprises a simple magnetron, preferably of the cavity type provided with an omnidirectional di-pole antenna. The magnetron is supplied with power from an ordinary commercial alternating current source through a suitable high-voltage transformer. It oscillates during the short time interval during each cycle of the source when its anode-cathode potential is sufficiently high to produce oscillations. Thus short trains of oscillations are transmitted.

The novel features that I consider characteristic of my invention are set forth with particularity in the appended claims. The invention itself, however, both as to its organization and its method of operation, together with additional objects and advantages thereof, will be understood from the following description of specific embodiments when read in connection with the accompanying drawings, in which:

Figure 1:
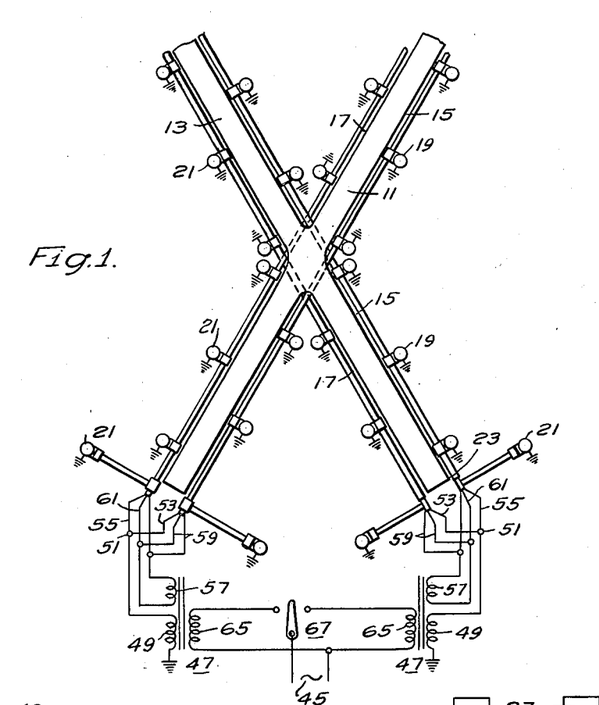
Figure 1 is a diagrammatic view showing two air strips on the same landing field provided with beacons in accordance with my invention.

In Fig. 1 a pair of intersecting air strips 11 and 13 are shown. The strips have the usual configuration of elongated rectangles. Along the boundaries 15 and 17 of each of the strips which are longitudinal to the direction of motion of a landing aircraft, beacons 19 and 21 respectively are disposed. As shown, the beacons 19 or 21 along each boundary may be uniformly spaced, those disposed along one boundary 15 of each strip being staggered with reference to those disposed along the opposite boundary 17. The spacing between successive beacons may also be non-uniform. For example, the spacing may be progressively smaller or larger, as the rear of the strip is approached. Moreover, the beacons need only be arranged effectively, and need not necessarily be arranged physically, along the boundaries of the air strips. For example, the beacons may be disposed along hypothetical lines which diverge or converge as the rear or the beginning of the air strip is approached. Beacons so arranged give the effect of being disposed along the boundaries of the strip although they are not necessarily physically so disposed.

The beginnings of the strips 11 and 13 are marked by beacons 21 disposed along hypothetical lines extending through the boundaries 23 marking the beginnings. The beacons 21 associated with each strip are preferably at substantial distances from the longitudinal boundaries of the strip. Where either transverse end of a strip may serve as the beginning depending on the direction of the wind, beacons marking the beginning should be disposed at both ends of the strip.

Figure 2:
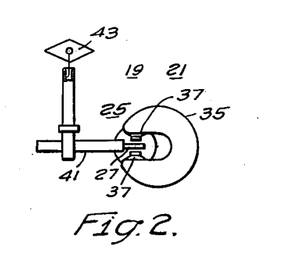
Fig. 2 is a diagrammatic view showing a beacon in accordance with my invention.
Figure 3:
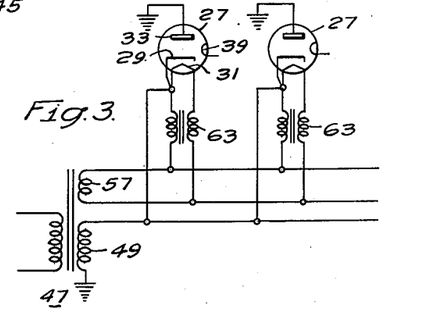
Fig. 3 is a diagrammatic view showing a beacon circuit in accordance with my invention.

While beacons of any general type well known in the art may be used, I prefer those of the type shown in Figs. 2 and 3 because of their simplicity. The beacon shown in these views comprises a cavity magnetron 25. The magnetron includes a metallic evacuated container 27 in the form of a thin circular cylinder into which a suitable cathode 29 and a filament 31 for heating the cathode are sealed. A cavity anode 33 (shown symbolically in Fig. 3) is mounted so that the cathode 29 is at its center. The flow of electrons between the cathode 29 and the anode 33 is subjected to a magnetic field perpendicular to the direction of the potential impressed between the cathode and the anode. The field is preferably derived from a permanent magnet 35 having the configuration of a circular horseshoe, the poles 37 of which are parallel to the bases of the container 27. The oscillations generated in the magnetron 25 may be picked up by an electromagnetic probe 39 as shown or they may be transmitted through a wave guide sealed into the container 27. In either eventuality the output of the magnetron is supplied through suitably terminated wave guides 41, coupled to the pick-up, to a dipole 43 designed to transmit horizontally polarized radiation of substantially equal intensity over an azimuth angle of 360°. The container 27 may be provided with suitable cooling pins.

The magnetrons 25 used in the preferred practice of my invention preferably radiate energy having a frequency of the order of 10,000 megacycles. However, my invention is not limited to magnetrons of this type nor is it in its broader aspects limited to magnetrons. High-frequency oscillation generators of any type, such as klystrons for example, capable of producing radiation of reasonably high frequency will also serve.

The magnetrons 25 are supplied with anodecathode potential and with filament potential from the ordinary commercial alternating current supply 45 available at airports. However, the magnitude of the potential required to cause a magnetron to produce appreciable radiation is of the order of several times the magnitude of the commercial supply potential and may be as high as one thousand to several thousand volts. For this reason high voltage transformers must be interposed between the source 45 and the beacons 19 and 21.

In accordance with my invention the number of such high voltage transformers and the consequent danger to service personnel is minimized. A single high voltage transformer 47 is provided for each strip 11 and 13. One terminal of the high voltage secondary winding 49 of each transformer is grounded, and the other is connected to the junction point 51 of a plurality of cables 53 and 55, which extend respectively along the boundaries of a strip and to the beacons 21 marking the beginning of the strip. Each of the transformers is also preferably provided with a filament winding 57, the terminals of which are connected to corresponding cables 59 and 61 extending along a strip and to the magnetrons marking the beginning of the strip. Under certain circumstances separate plate and filament transformers may be provided in lieu of a single winding transformer. At each beacon station the cathode 29 of the magnetron and one side of the filament 31 are connected to a point along the corresponding high voltage cable 53 or 55. The filament 31 of the magnetron at each station is connected to the filament supply cables 59 or 61 through suitable high frequency chokes 63 illustrated symbolically in Fig. 3, as coils.

The transformers 47 are preferably disposed at or near the control tower of the airport (not shown). Their primaries 65 are at one terminal connected to the supply 45 through a selector switch 67 by operation of which one or the other of the transformers may be supplied depending on the air strip 11 or 13 along which crafts are to land at a given time. When supplied with potentials the beacons 19 and 21 emit high frequency oscillation trains of short duration during the portion of each cycle of the supply source when the anode-cathode potential impressed on the magnetrons is sufficiently high for oscillation and positive. The output of the beacons thus constitutes pulse modulated radiation.

Figure 4:
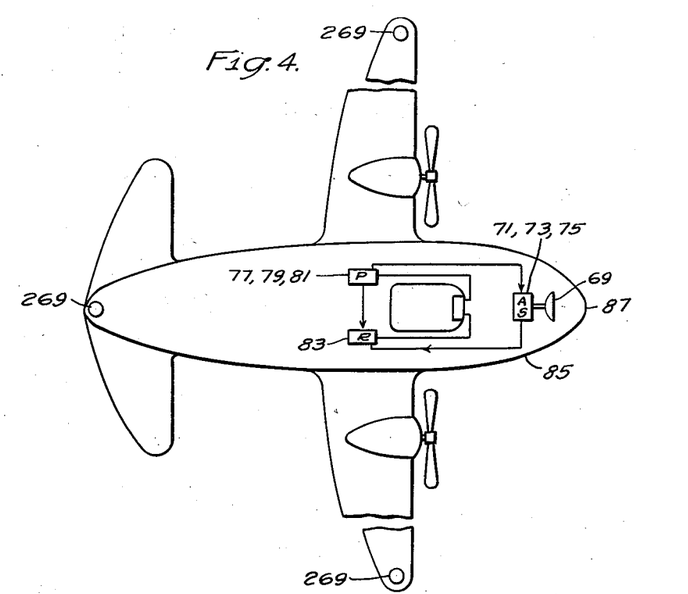
Fig. 4 is a view partly in top plan and partly schematic of an aircraft equipped in accordance with my invention.
Figure 5:
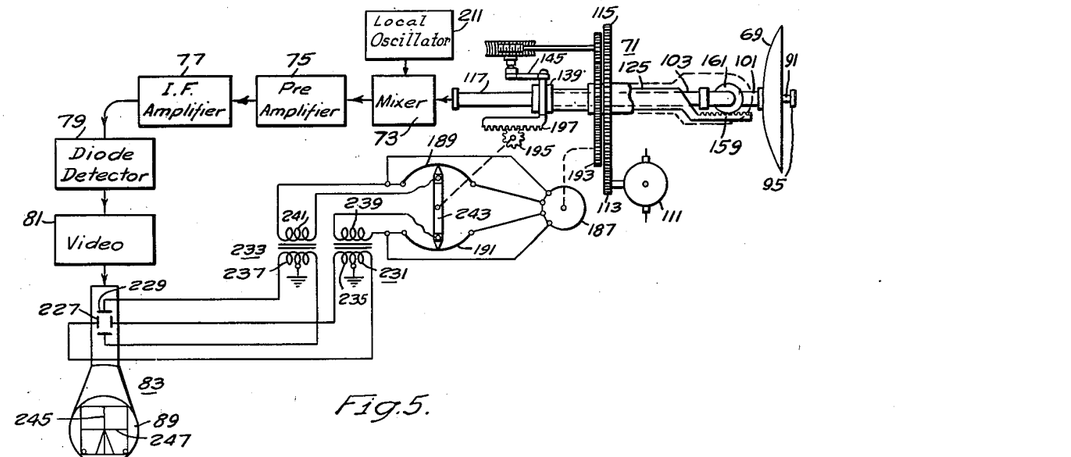
Fig. 5 is a block diagram showing a receiving system in accordance with my invention.

In Fig. 4 an aircraft provided with receiving equipment in accordance with my invention is shown and in Fig. 5 the receiving equipment is shown. The equipment comprises an antenna 69, a suitable driving mechanism 71, a mixer 73, an intermediate frequency pre-amplifier 75, an intermediate frequency amplifier 77, a detector 79, a video circuit 81 and an indicator 83. The antenna 69 and its driving mechanism 71 and the mixer 73 and the pre-amplifier 75 are mounted as a unit on the fuselage 85, preferably near the bow 87 of the craft. The intermediate frequency amplifier 77, detector 79 and video amplifier are combined into a unit which is mounted at a convenient position within the cabin of the craft. The indicator 83 is so disposed that its display surface 89 is at the dashboard of the craft or in any other position where it may be viewed by the pilot, co-pilot or other personnel of the craft assigned the duty of navigation.

Figure 6:
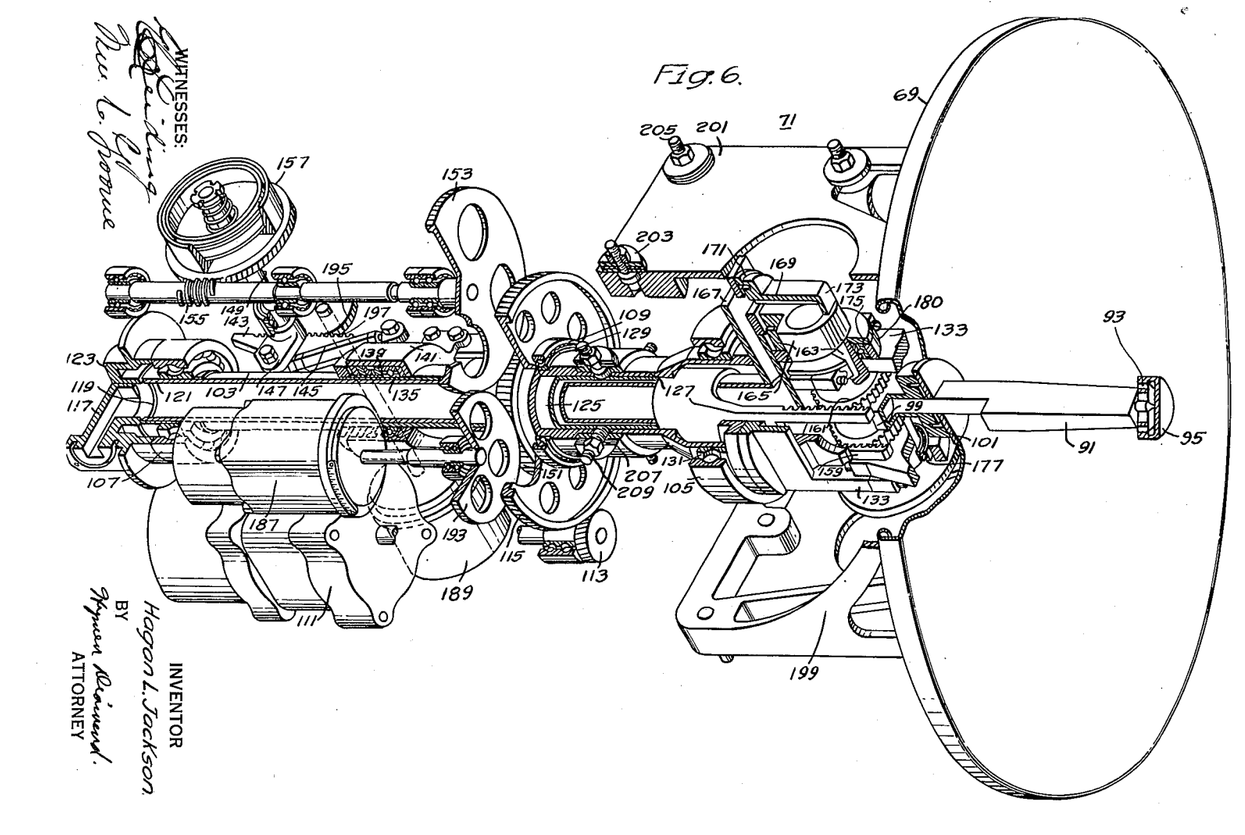
Fig. 6 is a view in perspective showing an antenna and its moving mechanism in accordance with my invention.

The antenna 69 and its driving mechanism are shown in detail in Fig. 6. The antenna 69 is a paraboloid reflector through the center of which a tapered wave guide 91 (Fig. 6) extends to the principal focal plane of the paraboloid. Over the end of the wave guide 91 a hollow cap 95 is secured. The cap 95 has symmetrically disposed openings 93 and forms a channel which communicates with wave guide 91 and constitutes a collector for the radiation reflected from the paraboloid 69. At its junction with the paraboloid 69 the wave guide 91 communicates with the wave guide 99 at the front of the driving mechanism 71 through a coupling choke 101.

The paraboloid 69 is secured to a hollow spinner shaft 103 (Figs. 5 and 6) through the coupling choke 101. The spinner shaft 103 is mounted rotatably on bearings 105, 107 and 109 at the front, rear and in the center, respectively, and is driven from a motor 111 through a pinion 113 and a helical gear 115. Preferably, the speed of rotation (spinning speed) of the paraboloid 69 is high, of the order of 1,200 revolutions per minute. The hollow spinner shaft 103 serves as a wave guide for the received radiations. At its rear end the hollow cavity in the shaft communicates with a rectangular wave guide 117, the longitudinal center line of which is perpendicular to the longitudinal center line of the shaft. At the junction of the rectangular wave guide 117 and the spinner shaft 103, a choke joint 119 is provided. The portion 121 of the choke joint 119 connected to the rectangular wave guide 117 is fixed and the portion 123 connected to the spinner shaft 103 rotates with it.

In addition to the rotating motion, the paraboloid 69 executes a nodding motion. The nodding motion is at a low rate compared to the rotating motion, preferably of the order of 15 cycles per minute. The paraboloid is thus rotated at a high speed, as it nods slowly.

The nodding mechanism comprises a sleeve 125 (Figs. 5 and 6) slidably interposed between a shell 127 enclosing the spinner shaft 103 and rotatable therewith. The shell 127 is secured to the rotating rings 129 and 131 of the center and front bearings 109 and 105, respectively. It carries a bracket 133 on which the front drive for the nodding mechanism is mounted.

At its rear the sleeve 125 is secured to the rotating ring 135 of a ball bearing assembly 139 mounted in a thrust bearing assembly 141. The thrust bearing 141 is mounted on a bracket 143 which is pivotally secured to the driven arm 145 of a turnbuckle. The driven arm 147 of the turnbuckle is secured to a shaft 149 which is rotated from the motor 111 through a gear 151 on the spinner shaft 103, a gear 153 driven by the latter gear and a worm 155 and a worm wheel 157. As the spinner shaft 103 rotates at the desired speed, the driving arm 147 of the turnbuckle rotates at a low speed, and the driven arm 145 reciprocates the thrust bearing assembly 139. The sleeve 127 rotates with the spinner shaft 103 relative to the thrust bearing assembly 139, and is at the same time reciprocated by it.

At its front end the sleeve 125 carries a two pronged rack 159 (Figs. 5 and 6) which drives two pinions 161. The horizontal axis of the pinion 161 is vertical. Coaxial with the pinions a hollow cylindrical shell 163 having a flange 165 at the top is secured. Near its lower end the vertical shell 163 communicates with the rectangular wave guide 99 extending from the paraboloid 69. At its upper end the shell 163 communicates with a vertical rectangular wave guide 167 through a short horizontal rectangular wave guide section 169 and a choke joint 171. The vertical wave guide 167 in turn communicates with the cavity within the spinner shaft 103. The short wave guide section 169 is secured to the choke joint 171 but at its other end has a short vertical projection 173 the rim of which engages the rim of the upper flange 165 of the vertical shell 163.

As the rack 159 is reciprocated by the movement of the sleeve 125, the pinions 161 are rotated forward and backward. The vertical shell 163 being secured to the pinion rotates with it. The horizontal wave guide section 169 and vertical wave guide 167 remain fixed as far as the rotation about the vertical axis of the pinion 161 is concerned and the shell 163 rotates relative to them. However, section 169 and the vertical wave guide 167 are secured to the spinner shaft 103 and therefore together with the reciprocating components rotate about a horizontal axis with the spinner.

The vertical shell 163 is supported in suitable ball bearings 175 and 177. The outer rings 180 of the ball bearings and the supporting brackets 133 for the nodding assembly are secured to the inner ring 131 of the front bearing 105 of the spinner and thus rotate with the spinner.

As the vertical shell 163 rotates forward and backward it carries with it the wave guide 99 secured to the paraboloid 69, and the paraboloid including the reflector 95. At the same time, the paraboloid is rotated with the spinner shaft 103.

Figure 7:
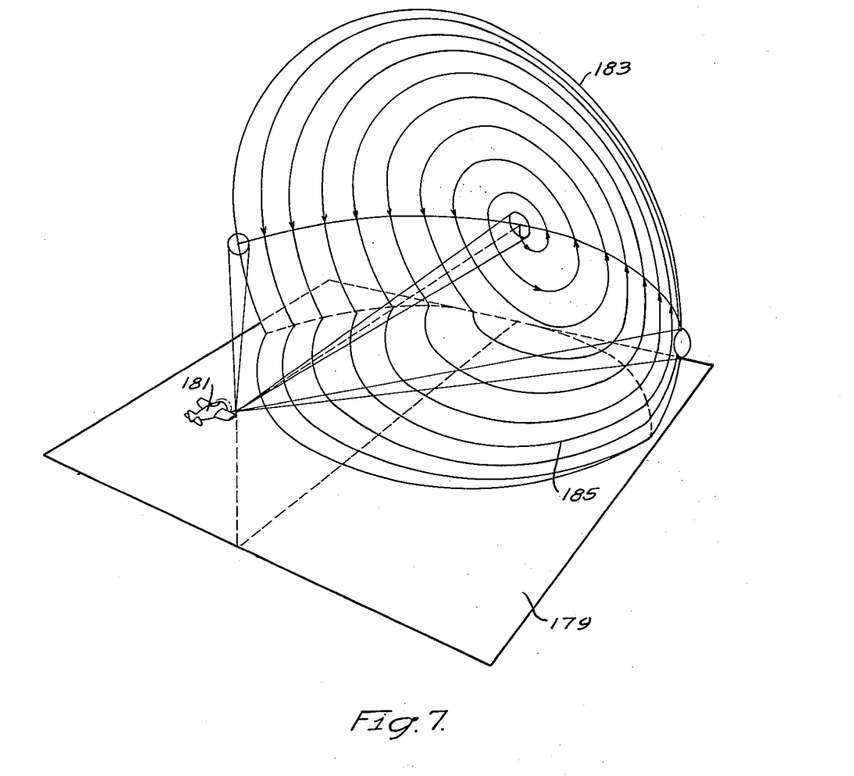
Fig. 7 is a diagrammatic view illustrating the scanning operation of an antenna in accordance with my invention.

As it moves in this manner, the hypothetical center line of the principal lobe of the paraboloid 69 traces a gradually diverging and converging spiral-like curve. The pattern traced is shown in Fig. 7. Where the center line of the lobe swings above the surface 179 over which the craft 181 is flying, the line at each point "points" an invisible spiral section 183 in space. On the surface the center line of the lobe "points" invisible converging and diverging arcs 185 of a spiral. With the line at any relative bearing and elevation, the paraboloid 69 is capable of receiving signals from transmitters, such as beacons, which are located within a solid angle about the line. The magnitude of the angle depends on the signal strength of the transmitted signal and on the angle of the lobe of the antenna 69. It is preferred that the power output of the beacons and the lobe angle should be such that with the craft from several hundred yards to several miles from the beacons the angle is a few degrees.

Electrical parameters corresponding to the instantaneous position of the paraboloid 69 are provided by a two-phase generator 187 and by two potentiometers 189 and 191, which are interconnected. The generator 187 is driven from the spinner shaft 103 through a helical gear 193. The potentiometers 189 and 191 are driven from a pinion 195, which is in turn rotated by a rack 197 reciprocated by the driving arm 145 of the turnbuckle.

For balancing the paraboloid 69, a bracket 199 having faces 201 extending parallel to the axis of the paraboloid is provided. On the faces of the bracket at various positions, washers 203 are secured in the requisite number by studs 205. The outer shell 127 of the spinner 103 is also balanced by washers 207 radially secured thereto by studs 209.

The driving mechanism for the paraboloid is mounted in a suitable housing (not shown). The housing is secured by brackets (not shown) to the fuselage of the aircraft. The brackets and the housing, where it is secured to the brackets, may be provided with the usual mechanisms for properly positioning the paraboloid. While the antenna is described here as mounted on the fuselage, it may also be mounted in the nose of the aircraft. In such an eventuality, the nose should be provided with a dielectric cover through which radiation may impinge on the paraboloid.

The antenna 69 and its driving mechanism 71 are similar to the antenna and driving mechanism of the AN/APS-6A air-borne radar equipment. If desirable, these units may be mounted on or in aircraft in the same manner as the latter. The mounting is illustrated and described in instruction book CO-AN-08-30APS6-2.

Radiant energy received by the paraboloid is gathered by the reflector 95 at the principal focus of the paraboloid and transmitted through the tapered wave guide 91, through the shell 163, the horizontal and vertical wave guide sections 169 and 167, the spindle 103 and the rectangular wave guide 117 which communicates with the spindle. Near the terminal of the rectangular wave guide 117, the radiant energy impinges on the mixer 73. In the mixer the oscillations received are mixed with oscillations from a suitable local oscillator 211 which, in the preferred practice of my invention, is a klystron. Intermediate frequency oscillations modulated in accordance with the received signal are thus produced. For a system operating at a frequency of 10,000 megacycles, the intermediate frequency should be of the order of 60 megacycles.

Figure 8A:
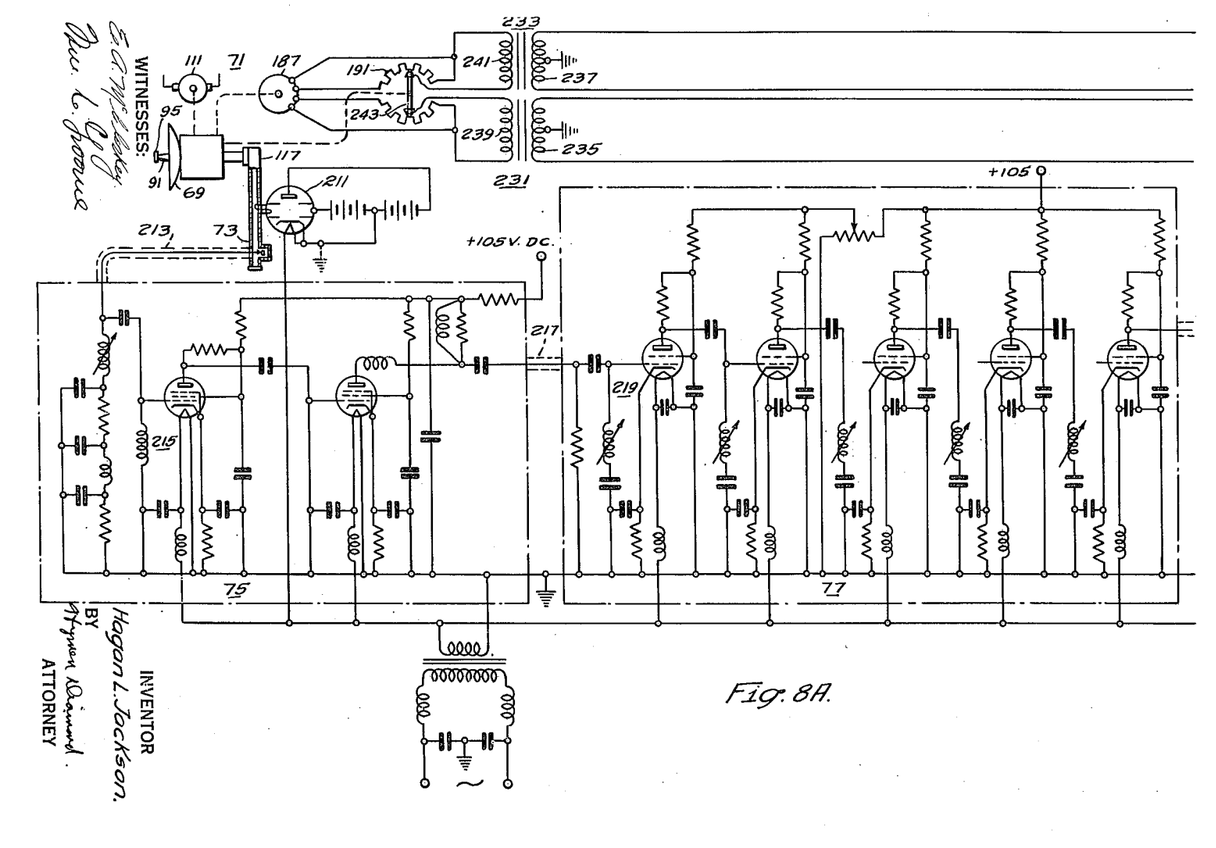
Figs. 8A, 8B and 8C together constitute a circuit diagram showing a receiver and an indicator in accordance with my invention.

The modulated intermediate frequency oscillations are transmitted through a coaxial conductor 213 to the input circuit 215 of the intermediate frequency pre-amplifier 75.

Figures 8B, 8C:
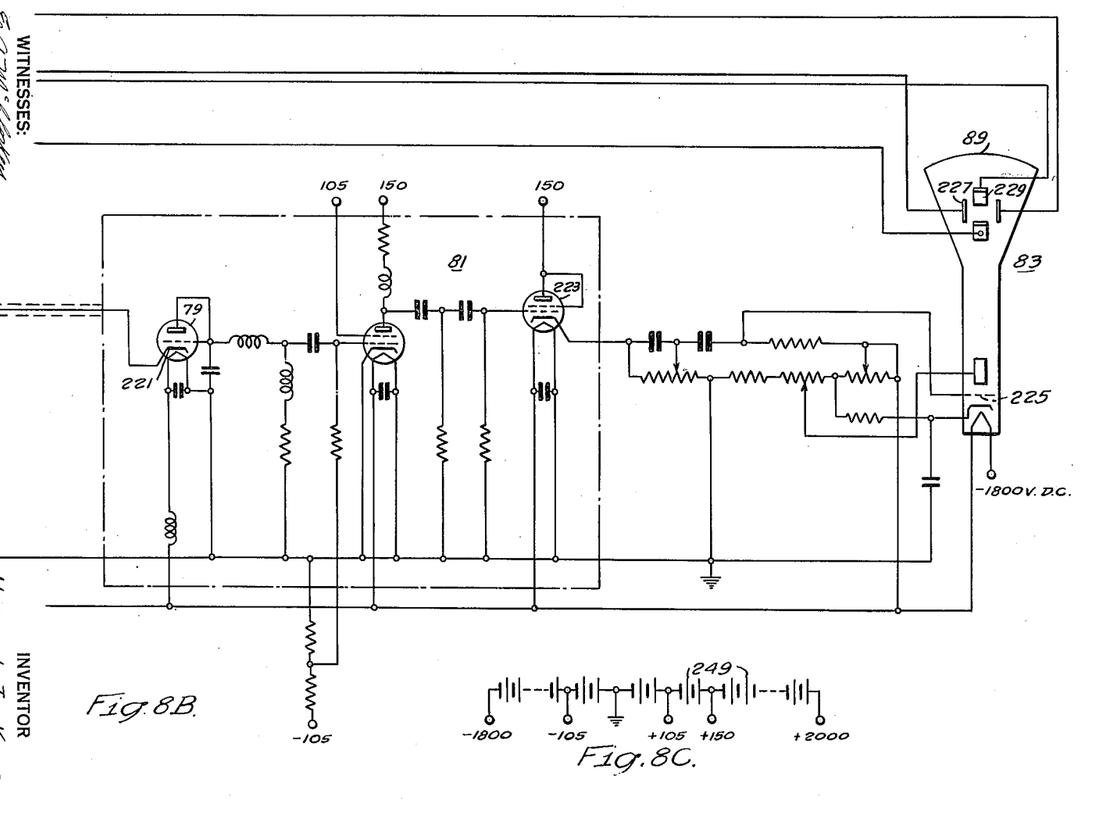

The output of the pre-amplifier is carried by a suitable coaxial cable 217 to the input circuit 219 of the intermediate frequency amplifier 77 which has five stages. The output of the last stage of the intermediate frequency amplifier is impressed on the cathode 221 of the detector. The output of the detector is impressed on the input circuit of the two-stage video amplifier 81. The last stage 223 of video amplifier is essentially a video limiter and operates as a cathode follower. The output of this stage is impressed on the intensity grid 225 of the indicator 83 which is a cathode ray tube. In the absence of a signal from the last video stage, the intensity grid 225 of the indicator is biased to cut off. When a signal is impressed on the grid, electrons are transmitted to the display screen 89 and a luminous spot is produced on the screen.

The indicator 83 is provided with means for deflecting the electron beam which may be electrostatic horizontal and vertical plates 227 and 229, respectively, as shown, or magnetic deflection coils. The deflection plates 227 and 229 are supplied with potentials from two transformers 231 and 233, the secondaries 235 and 237, respectively, of which are connected across opposite plates 227 and 229, respectively. The midtaps of the secondaries are grounded. The primaries 239 and 241 of the transformers 231 and 233, respectively, are supplied from the quadrature phase windings of the generator 187 through the potentiometers 189 and 191 which are controlled from the turnbuckle. The common movable arm 243 of the potentiometers 189 and 191 is so set that when the paraboloid 69 is spinning in its center position, the potentials impressed across the deflecting plates from the transformers 231 and 233 is a minimum. As the paraboloid 69 nods slowly to its extreme angular position, the potentials impressed across the plates increase. With the potentiometers in any position the potentials impressed on the sets of deflecting plates 227 and 229 are sinusoidal and in phase quadrature (90° displaced in phase). The resultant deflection impressed on the electron beam by such quadrature sinusoidal potentials is circular. As the movable arm 243 of the potentiometers 189 and 191 reciprocates, the diameter of the circle moves inward and outward and a spiral scan is produced.

The spiral scan is synchronized with the movement of the paraboloid 69. The point at which a cathode ray beam would at any instant impinge on the screen of the indicator if it were not blocked by the intensity grid 225 is determined by the relative bearing and elevation of the center line of the principal lobe of the paraboloid at that instant. Accordingly, when the bias on the grid 225 is counteracted by a signal and a spot appears on the screen 89, the position of the spot is determined by the relative elevation and bearing of the source of the signal. To enable one viewing the screen of the indicator to determine the angular position of the objects from which signals are received with facility, vertical and horizontal reference lines 245 and 247, respectively, which intersect at the center, are provided on the screen 89.

The power supply for the mixer 73, pre-amplifier 75, IF amplifier 77, detector 79, video 81 and indicator 83 is shown symbolically in Fig. 8C as a system of batteries 249. In actual practice it comprises a motor-generator (800 cycle output) supplied from the batteries of the craft and suitable rectifying and stabilizing circuits associated with the motor-generator. Such a power supply is shown in instruction book CO-AN-08-30APS6-2. A vibrator may be used in lieu of a motor-generator set.

Figure 9:
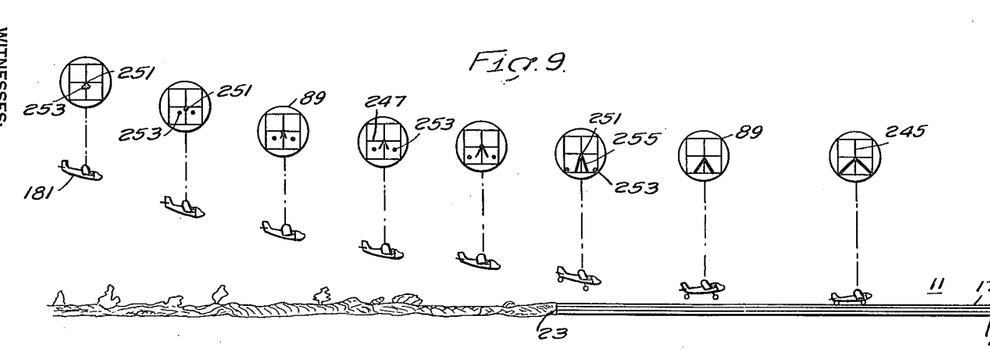
Fig. 9 is a view partly in perspective and partly diagrammatic illustrating the practice of my invention during a landing operation.

The manner in which a system constructed according to my invention is used in an instrument landing operation is illustrated in Fig. 9. As an aircraft 181 approaches the strip 11 its antenna 69 picks up the signals from the beacons 19 and 21 and indications appear on the indicator screen 89. When the aircraft is at a substantial distance, of the order of four or five miles, from the strip 11, the signals 251 and 253 from the beacons 19 and 21, respectively, are closely bunched. The signals 253 from the beacons 21, marking the start of the strip 11, appear as two closely spaced dots while the signals 251 from the beacons 19 along the strip appear as a single dot. If, when the craft is far away from the strip, its bow-stern line is in line with the beacons 19 along the strip, the signals 251 from the beacons will be received by the paraboloid 69 when the paraboloid is spinning near its center position. The signals 251 will therefore be displayed in the center of the screen as shown in the extreme left-hand position of Fig. 9. If the bow-stern line of the craft is at the same time directed along the center of the strip, the signals from the beacons marking the start of the strip will be received when the antenna nods to the same angle to the left and right, respectively. The displayed signals 253 from the beacons will be along a line of which the vertical marking line 245 is the perpendicular bisector.

The position of the grouped dots 251 and 253 on the screen 89 will depend on the position to which the paraboloid 69 must be turned to receive the dots and therefore on the position of the craft 181 when the signals are received. If the aircraft is flying above its proper landing position, the center dot 251 will appear below the center of the screen; if the aircraft is too low, the center dot will appear above the center. If the aircraft is displaced to the left of its proper landing position, the dots 253 will be displaced towards the right; if the aircraft is displaced towards the right, the dots 253 will be displaced towards the left.

As the aircraft 181 approaches the landing strip 11, the signals 253 corresponding to the beacons marking the start of the strip become progressively separated and appear at positions lower and lower on the screen. The first phenomenon occurs because the antenna 69 must nod to greater and greater angles right and left to pick up the signals from the beacons 21 as the beacons are approached. The beacons appear lower and lower on the screen 89 because the bow-stern line of the craft is becoming more and more horizontal as it approaches the strip and the antenna must nod to a greater relative elevation to pick up the beacons 21. However, if the aircraft is to be maintained along the center of the strip the vertical marking line 245 of the screen must be maintained as the perpendicular bisector of the line between the dots 253.

The more remote beacons 19 along the strip continue to produce signals 251 at the center of the screen 89 as the craft approaches the strip. These beacons are still along the bow-stern line of the craft and are received when the antenna 69 is in the center position. The beacons 19 progressively nearer the craft produce signals 255 to the right and left of the vertical marking line 245 similar to the signals 253 produced by the beacons marking the start of the strip. The resultant pattern is a luminous angle. The angle should be bisected by the vertical marking line 245 and have its apex at the center of the screen 89 if the craft is landing properly.

If the craft is oriented improperly during any portion of the approach, the paraboloid 69 will receive the signals from the beacons while it is turned to a position not symmetrical about the bow-stern line of the craft, and the display will be distorted. In effect, the display appears to the pilot or the member of the crew under duty to observe it, as a lighted highway being approached and seen through the screen 89. To land properly the procedure which one follows when they are motoring along a one-way highway need be followed.

Figures 10, 10A, 10B, 10C, 10D, 10E:
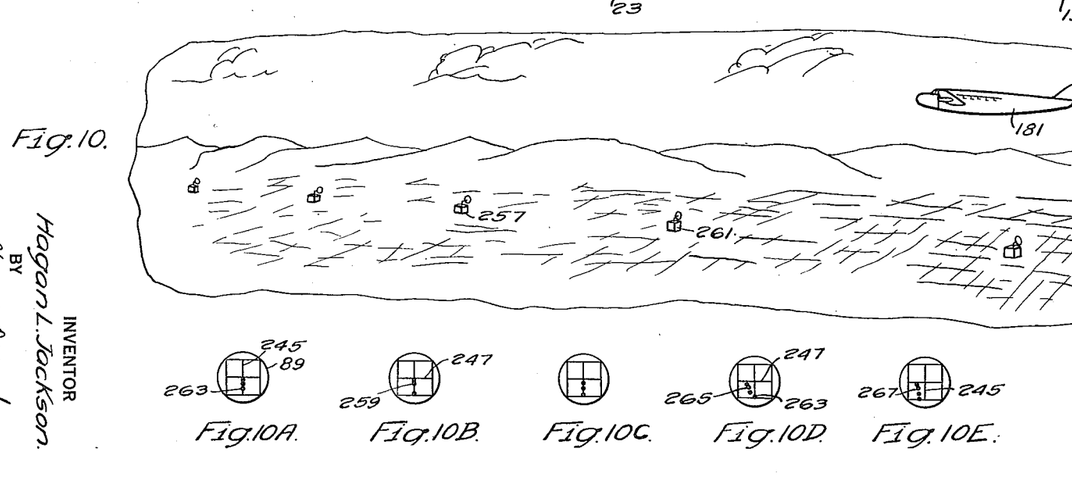
Fig. 10 is a view in perspective showing a craft flying along the course provided with beacons in accordance with my invention.
Figs. 10A to 10E are views in front elevation of the display viewed by a pilot in the craft shown in Fig. 10 during a hypothetical flight along the course.

Fig. 10 shows a craft 181 flying along a course marked by beacons 257 in accordance with my invention. Figs. 10A, 10B and 10C show the display of signals received from the beacons 257 when the craft is flying on course at different altitudes along the course. Fig. 10A corresponds to the lowest altitude; 10B a higher altitude; and 10C a still higher altitude. The signals 259 from the more remote beacons are bunched near the center of the screen since they are received from beacons in effect along the bow-stern line of the craft. The beacon 261 nearest the craft produces a signal 263 well down the vertical marking line 245. In Fig. 10D the display for a plane on the course but headed off course is shown. In this case, the signals 265 corresponding to the more remote beacons are off the vertical line 245. In Fig. 10E the display for a craft flying off course but parallel to the course is shown. In this case, the signals 267 are all off the line 245.

It is anticipated that in the near future aero traffic will become relatively dense. Under such circumstances, provisions for avoidance of collision are indispensable. My invention in certain of its aspects can be applied for anti-collision purposes. For such purposes, aircraft are provided with beacons 269 in accordance with my invention. Preferably the beacons should be symmetrically mounted on the craft. For example, beacons may be mounted on the tips of the wings and on the tail. The beacons on such aircraft transmit signals which will be received by the receiving equipment of neighboring craft. The pilots of neighboring craft will thus be in a position to determine the relationship of the craft so equipped to them. If, for example, the indicator of a craft shows a dot at the center of the screen 89 and two dots slightly below it but centered about the vertical line 245, and the distance between the latter dots appears to be diverging rapidly, the craft is rapidly approaching another craft.

Although I have shown and described certain specific embodiments of my invention, I am fully aware that many modifications thereof are possible.

While my invention is shown here as applied to aircraft navigation, in its broader aspects it is applicable to navigation of surface craft. For example, beacons according to my invention may be disposed on buoys along a water channel and ships may be provided with receivers enabling them to follow the channels. While the beacons in the embodiments disclosed herein are modulated only in accordance with the oscillations of the source, they may be modulated in other ways, For example, beacons along different courses and along different strips of an airfield may be provided with rotating switch keyers which modulate them in a characteristic manner. Alternatively manual keyers may be provided. In either event the keyers may be connected in the primary circuits of the transformers 47. While my invention has been shown herein as applied to blind landing, it may equally as well be applied to blind taking-off.

My invention is not to be restricted except in so far as is necessitated by the prior art and by the spirit of the appended claims.

I claim as my invention:

1. A beacon comprising a magnetron of the cavity type having a cavity anode and a cathode, means for deriving from a commercial supply of alternating current potential pulsations having the frequency of said supply and having an amplitude sufficient, when said pulsations are impressed between said anode and said cathode, to cause said magnetron to oscillate at its natural frequency, means for impressing said pulsations between said anode and cathode and means for radiating energy derived from the oscillations of said magnetron.

2. A beacon comprising a magnetron of the cavity type having a cavity anode and a cathode, a transformer, means for connecting the secondary of said transformer between the anode and the cathode of said magnetron, the ratio of said transformer being such that when the primary of said transformer is connected across a commercial supply of alternating current the potential across the secondary is of a magnitude sufficient to cause said magnetron to oscillate at its natural frequency and means for radiating energy derived from the oscillation of said magnetron.

3. In combination a magnetron of the cavity type having a cavity anode and a cathode, a transformer and means for connecting the secondary of said transformer between said anode and said cathode, the ratio of said transformer being such that when its primary is connected across a commercial supply of alternating current the secondary potential is sufficient to cause said magnetron to oscillate at its resonant frequency.

HAGAN L. JACKSON.

REFERENCES CITED

The following references are of record in the file of this patent:

UNITED STATES PATENTS

| Number | Name | Date |
| --- | --- | --- |
| 1,615,712 | Loth | Jan. 25, 1927 |
| 2,069,538 | Philpott | Feb. 2, 1937 |
| 2,146,724 | Dunmore | Feb. 13, 1939 |
| 2,151,549 | Becker | Mar. 21, 1939 |
| 2,216,707 | George | Oct. 1, 1940 |
| 2,217,745 | Hansell | Oct. 15, 1940 |
| 2,226,860 | Greig | Dec. 31, 1940 |
| 2,396,112 | Morgan | Mar. 5, 1946 |
| 2,400,232 | Hall | May 14, 1946 |
| 2,408,039 | Busignies | Sept. 24, 1946 |
| 2,408,425 | Jenks et al. | Oct. 1, 1946 |
| 2,412,345 | Lindenblad | Dec. 10, 1946 |
| 2,414,791 | Barrow | Jan. 28, 1947 |
| 2,434,957 | Quarles | Jan. 27, 1948 |
| 2,436,805 | Hoffman | Mar. 2, 1948 |
| 2,445,618 | Hutcheson | July 20, 1948 |
| 2,454,971 | Langmuir | Nov. 30, 1948 |
| 2,456,666 | Agate et al. | Dec. 21, 1948 |
| 2,458,574 | Dow | Jan. 11, 1949 |